United States Patent [19]

Tomberlin

[11] Patent Number: 4,939,778
[45] Date of Patent: Jul. 3, 1990

[54] TELEPHONE CORD COVER

[76] Inventor: Anita A. Tomberlin, 305 W. Riverwood, Hopkinsville, Ky. 42240

[21] Appl. No.: 218,961

[22] Filed: Jul. 14, 1988

[51] Int. Cl.$^5$ ........................................... H04M 1/15
[52] U.S. Cl. ..................................... 379/438; 379/451; D14/250
[58] Field of Search ............... 379/441, 457, 451, 438, 379/437, 428, 440; D14/250; 174/117 F, 69, DIG. 11, 36

[56] References Cited

U.S. PATENT DOCUMENTS

| | | | |
|---|---|---|---|
| 1,485,994 | 3/1924 | Salisbury . | |
| 2,585,054 | 2/1952 | Stachura | 174/36 |
| 2,795,641 | 6/1957 | Rowell | 174/135 |
| 3,038,558 | 6/1962 | Plummer | 184/16 |
| 3,209,061 | 9/1965 | Mier et al. | 174/5 |
| 3,310,332 | 3/1967 | Carroll | 285/18 |
| 3,654,049 | 4/1972 | Ausnit | 161/7 |
| 4,281,211 | 7/1981 | Tatum et al. | 174/36 |
| 4,313,645 | 2/1982 | Cocco | 174/117 F X |
| 4,391,303 | 7/1983 | Holgersson | 138/166 |
| 4,546,217 | 10/1985 | Frehn | 379/452 |
| 4,723,822 | 2/1988 | Merdic | 439/502 |
| 4,736,418 | 4/1988 | Steadman | 379/451 |

Primary Examiner—Jin F. Ng
Assistant Examiner—Randall S. Vaas

[57] ABSTRACT

A protective handset cord cover is secured around a handset cord to prevent the handset cord from becoming tangled with itself. The cover is of sufficient length to accommodate a normal and customary stretched length of the handset cord so that the handset cord is prevented from twisting upon itself and becoming entangled. The cover is of a flexible, planar material and is easily placed around a handset cord. The cover is particularly suited for use with handset cords having modular ends which are removable from a phone base at one end and from a handset at the other end or, in an alternate embodiment, for use with older model telephones or car phones in which the handset cord is permanently secured to the phone base at one end and to the handset at the other end.

10 Claims, 2 Drawing Sheets

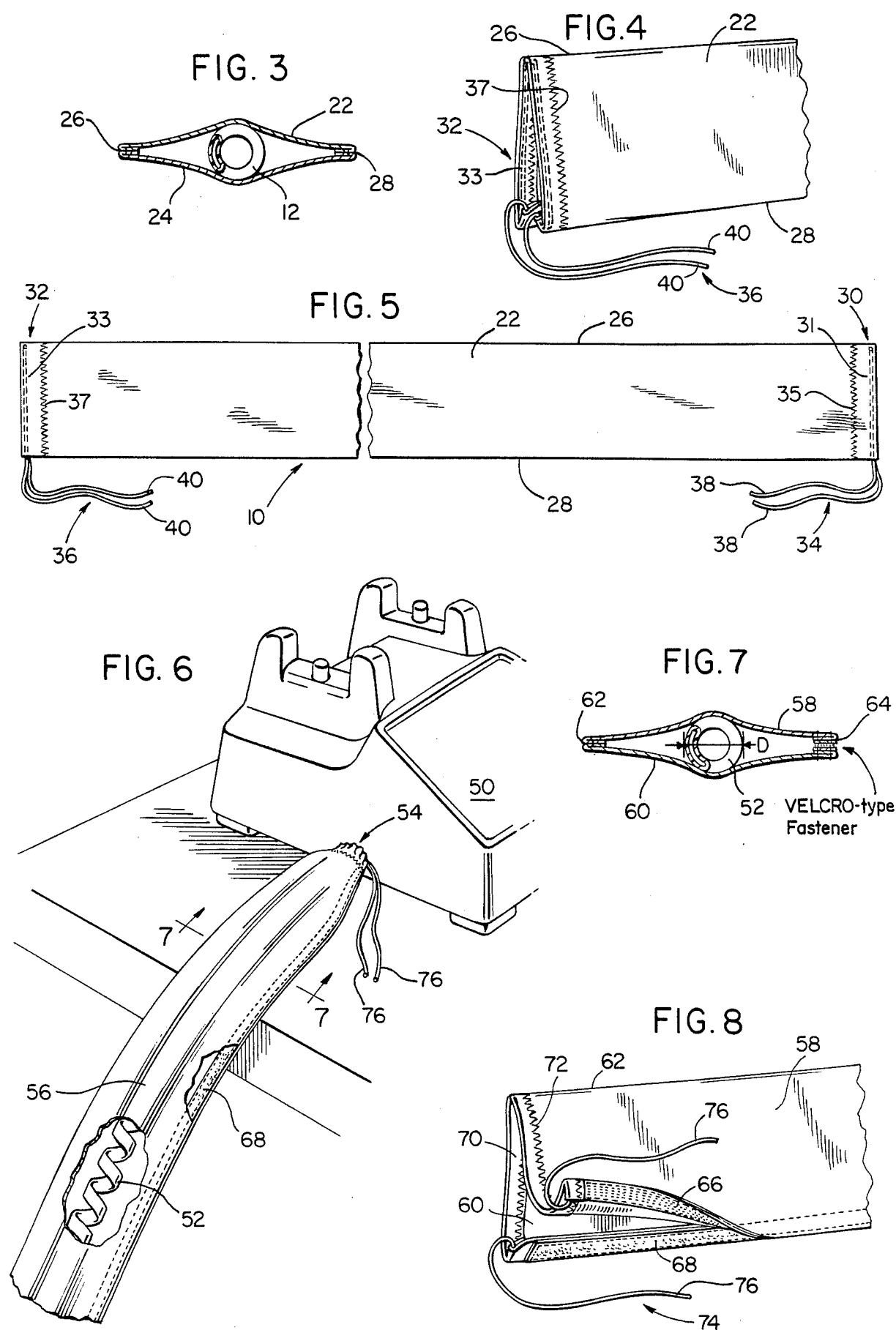

TELEPHONE CORD COVER

FIELD OF THE INVENTION

The present invention relates to a cover for a plastic-coated coil telephone cord designed to prevent tangling and twisting of the cord during use of the telephone.

BACKGROUND OF THE INVENTION

Few inventions have so altered society as the telephone. With the words, "Watson, come quickly, I need you," Alexander Graham Bell revolutionized the world of communications. From the old-fashioned "horn" box to the rotary dial to the touch-tone, the telephone has vastly broadened the scope of communications.

While remote or cordless phones have become increasingly popular, the majority of telephones in use today have plastic-coated, coiled cords stemming between the telephone base and handset. Accordingly, a problem associated with the modern-day telephone is the annoying tangling of the telephone cord caused, for example, by users who fidget or twist and turn or who pace during their telephone conversations. This is especially problematic when using a 9-or 25-foot cord, which is stretched and, upon release of tension on the cord, has a natural tendency to twist or tangle. Moreover, the plastic material used to coat telephone cords is a pliable material which tends to twist and tangle due to changes in atmospheric conditions.

One proposed solution to this problem can be found in the cord supporting coil of U.S Pat. No. 2,795,461 to Rowell, in which a length of formed resilient material includes a flexible metallic insert molded therein with a cord-receiving slot. The handset cord is inserted in the cord supporting coil by opening the slot leading into the cord supporting coil and winding the handset cord in until the entire handset cord is housed completely within the spiral cord supporting coil. This patent merely reinforces the original coil structure of the handset cord and, over time, will result in similar problems to that of a regular handset cord.

SUMMARY OF THE INVENTION

By the present invention, a protective handset cord cover is secured around a handset cord to prevent the handset cord from becoming tangled with itself. The cover is of sufficient length to accommodate a normal stretched length of the handset cord so that the handset cord is prevented from twisting upon itself and becoming entangled. The cover is of a flexible, planar material and is easily placed around a handset cord. The cover is particularly suited for use with handset cords having modular ends which are removable from a phone base at one end and from a handset at the other end or, in an alternate embodiment, for use with older model telephones or car phones in which the handset cord is permanently secured to the phone base at one end and to the handset at the other end.

It is an object of the present invention to provide a handset cord cover which protects the handset cord from becoming twisted or entangled.

It is another object of the present invention to provide a handset cord cover which protects the handset cord from becoming twisted or entangled and which is of a length to accommodate a normal stretched-out length of the handset cord.

It is yet another object of the present invention to provide a handset cord cover which protects the handset cord from becoming twisted or entangled and which is of a length to accommodate a normal stretched-out length of the handset cord, which is placeable around a handset cord having modular connections or a permanently fixed handset cord.

It is still yet another object of the present invention to provide a handset cord cover which protects the handset cord from becoming twisted or entangled and which is of a length to accommodate a normal stretched-out length of the handset cord, which is placeable around a handset cord having modular connections or permanently fixed handset cord and that is relatively flexible for gathering when the handset cord is in a relaxed condition.

These and other objects of the invention, as well as many of the intended advantages thereof, will become more readily apparent when reference is made to the following description, taken in conjunction with the accompanying drawings.

BRIEF DESCRIPTION OF THE DRAWINGS

FIG. 3 is a sectional view taken along the line 3—3 of FIG. 2.

FIG. 4 is a perspective view of an end of the handset cord cover.

FIG. 5 is a side view of a handset cord cover prior to its placement around a handset cord.

FIG. 6 is a perspective view of an alternate embodiment of a handset cord cover shown covering a handset cord in a stretched condition.

FIG. 7, is a sectional view taken along line 7—7 of FIG. 6.

FIG. 8 is a perspective end view of the handset cord cover shown in FIG. 7.

DETAILED DESCRIPTION OF THE PREFERRED EMBODIMENTS

Figure 1:
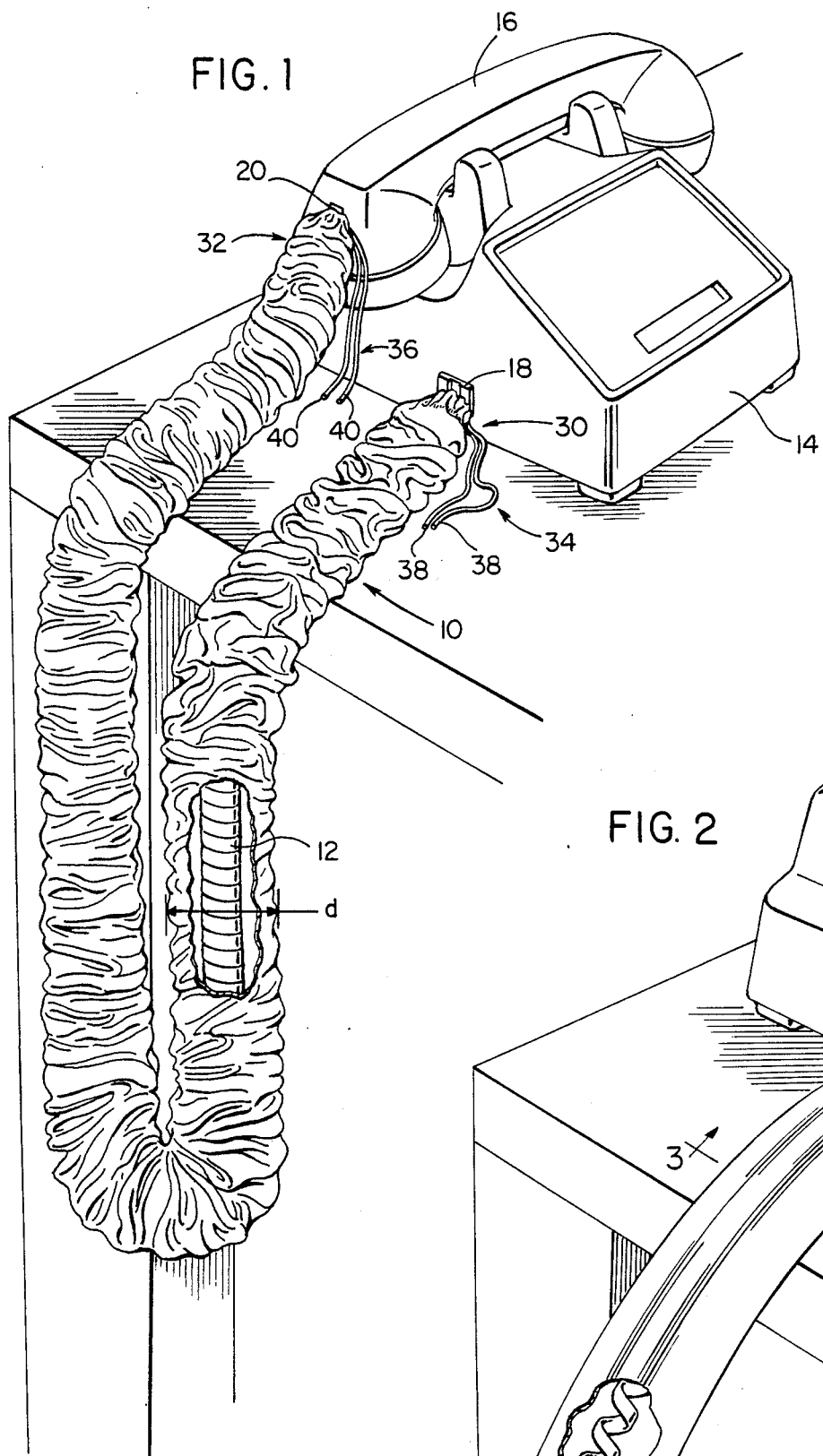
FIG. 1 is a perspective view of a handset cord cover of the invention, partially in section, shown covering a handset cord.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings in general, and to FIGS. 1-5 in particular, a handset cord cover embodying the teachings of the subject invention is generally designated as 10. With reference to its orientation in FIG. 1, tubular handset cord cover 10 is shown surrounding a handset cord 12, which is shown in a relaxed condition. The handset cord 12 extends between telephone base 14 and handset 16. The handset cord is plugged into the telephone base 14 at modular jack 18 and at the opposite end connected to handset 16 at modular jack 20.

The length of the handset cord cover 10 is less than the stretched length of the handset cord 12. Typically, for a long extension cord which is 25 feet long when stretched to a straight line, a 110 inch long cord cover will be used. For an extension cord which is 12 feet long when stretched to a straight line, a 90 inch long cord cover is used. The length of the cord cover is sufficiently long to cover both ends of a handset cord during ordinary use. Of course, if ordinary use of the cord is greater than the lengths of the cord cover described, a longer cord cover could be used to maintain the cord within the cord cover to obtain the benefits of the invention. Therefore, when the handset cord is in the relaxed condition, as shown in FIG. 1, the handset cord cover 10 is gathered upon itself to allow for subsequent elongation upon stretching of the handset cord.

The handset cord cover is made of two layers 22 and 24, which are substantially equal in length and width. The two layers are stitched together along opposed edges 26 and 28, as is best shown in FIG. 3 to form a tubular cover. The inner diameter d of the cover 10, as shown in FIG. 1, is greater than a cross-sectional diameter D of coils forming the coiled telephone handset cover 10 as shown in FIG. 7. The continuous width of the material between edges 26 and 28 is approximately 2¼ to 2½ inches. The distance between ends 30 and 32 in the lay-flat condition shown in FIG. 5 is less than the stretched length of the telephone cord which is to be surrounded by the cover 10.

At each end 30 and 32, the layers 22 and 24 are folded back upon themselves to form pockets by stitching 35, 37 within which strings 34 and 36, respectively, are held in Place. Free ends 38 and 40 of the strings extend from pockets 31, 33, respectively.

To secure the cover 10 around the cord 12, one end of the cord 12 is released from the modular jack 18. The free end of the cord is then threaded through the opening between fabric layers 22 and 24 at end 32 of the cover. When the end 32 approaches the opposite end of the cord at modular jack 20, the free ends 40 of string 36 are pulled taught and tied together. This secures end 32 of the cover adjacent to the handset of the telephone. Since the length of the cord in its relaxed condition, as shown in FIG. 1, is much less than that of the total length of the cover 10, the cover is pushed over the cord towards the handset 16 so as to gather the cover along the length of the cord. When the cover completely surrounds the cord, the end of the cord which had been removed from jack 18 is reinserted into the jack 18 at the telephone base 14. The free ends 38 of string 34 are then tied to secure the end 30 of the cover around the cord. Any excess length of the free ends 38 and 40 of the strings 34 and 36 may be cut off adjacent to the modular jacks 18 and 20.

Figure 2:
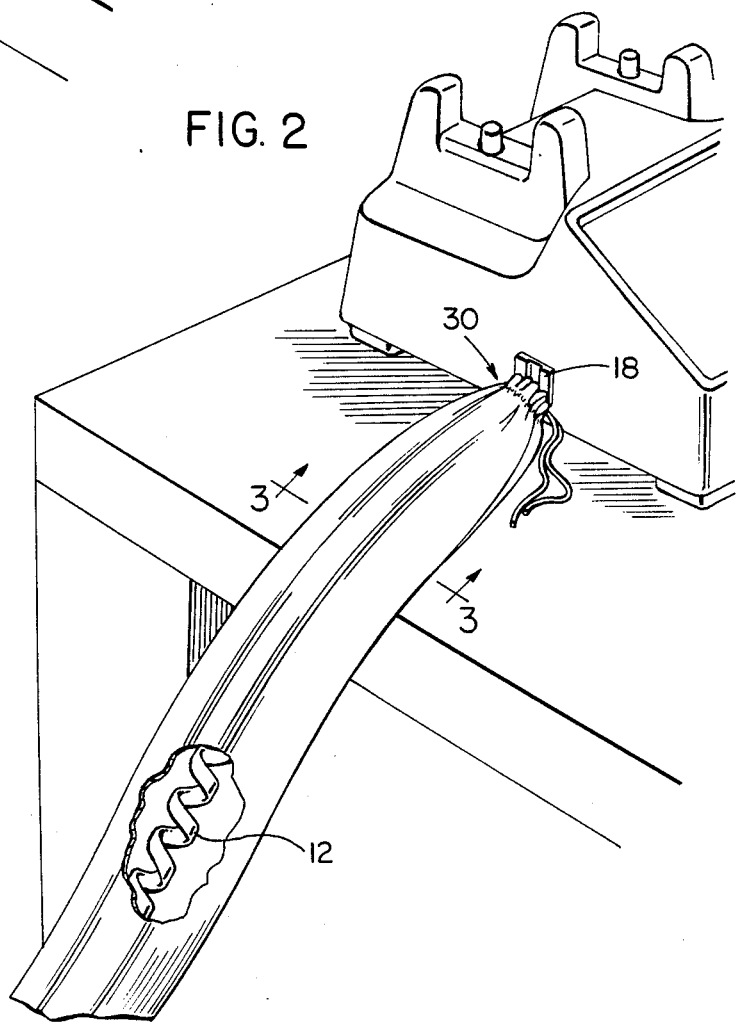
FIG. 2 is a perspective view of a handset cord cover shown covering a handset cord in a stretched condition.

When the handset 16 is lifted to make or receive a call, the cord 12 is changed to a stretched condition, as shown in FIG. 2. Under the usual and customary stretched condition of the cord, the gatherings of the cover 10 are unfolded to allow for the expansion of the cord and will ultimately accommodate a usual and customary stretching of the cord since the total length of the cover is at least the compressed, relaxed length of the cord. Therefore, the cover will assume a more flat appearance, as shown in FIG. 2.

In FIGS. 6-8, an alternate embodiment of the handset cord cover is shown used in conjunction with a telephone base 50 and a handset cord 52, which is permanently secured to the base 50 at connection 54, as is the case with older telephones lacking a modular connection of the handset cord with the base and with car telephones, which integrally interconnect the handset and transmitter base. To locate the handset cord cover 56 around the handset cord 52, the cover 56 includes an edge which is resealable so that the cord 52 may be inserted into the cover and then the cover resealed around the cord.

As shown in FIG. 7, the cover 56 includes two layers 58 and 60 of fabric material which are sewn together along edge 62 by folded in edge portions of each layer. At edge 64, a VELCRO-type fastener is used to releasably seal the edge 64 of the layers 58 and 60.

Along the edge of layer 58, as shown in FIG. 8, are a plurality of hooks 66 which engage and attach to a fabric strip 68 secured to an opposing edge of layer 60. As performed in a known manner, the hook 66 and the fabric strip 68 engage and are disengaged from each other to form a seal along edge 64. As in FIGS. 1-5, a pocket 70 is formed along the edge of both ends of the cover 56 by stitches 72 so as to locate a string 74 having free ends 76 within the pocket 70.

To secure the cord 52 between the layers 58 and 60 of the cover, the VELCRO-type connection along the edge 64 is separated and the cord 52 moved into the space between the layers 58 and 56. When the entire cord has been located inside the cover 56, the VELCRO-type fastener hooks 66 and fabric strip 68 are reconnected to seal the edge 64 of the cover.

As shown in FIG. 6, string 74 is drawn tightly around the cord 52 at connection 54 and the free ends 76 are tied together to secure the cover around the cord at the telephone base. This same procedure is performed at the connection of the cord to the handset. As in FIGS. 1-5, when the cord 52 is stretched to a usual and customary length due to use of the handset, as shown in FIG. 6, the cover 56 will expand to the length of the cord, since the length of the cover is at least equal to the normal and customary stretched length of the cord.

When the handset is in use, the handset cord is prevented from tangling by the presence of the cord cover surrounding the cord. Any attempt of the cord to intertwine with an adjacent section of the cord is thwarted by the cover covering the cord. Tangling within the cover itself is also prevented because of the dimensions of the cover around the cord.

Thus, by the present invention, the problems previously encountered by the tangling of telephone handset cords is avoided in a simple manner. Advantageously, the cord cover is removably mounted around the cord for changing or cleaning of the cord cover.

Having described the invention, many modifications thereto will become apparent to those skilled in the art to which it pertains without deviating from the spirit of the invention as defined by the scope of the appended claims.

I claim:

1. A telephone handset cord cover comprising:
an elongated tube having an inner diameter greater than a cross-sectional diameter of coils forming a coiled telephone handset cord and having a greater length than the coiled telephone handset cord in a relaxed condition for loosely surrounding the coiled telephone handset cord when the coiled cord is in either an extended or relaxed condition so as to prevent twisting and tangling of the coiled telephone handset cord, and
means at each end of said tube for securing each end of said tube to a respective end of the coiled telephone handset cord,
said tube being sufficiently flexible to gather together when the coiled cord is in the relaxed condition and movable to a less gathered condition when the coiled cord is in the extended condition.

2. A telephone handset cord cover as in claim 1, wherein said tube includes at least one seam along its length.

3. A telephone handset cord cover as in claim 2, wherein said at least one seam is formed by two edges of said tube secured together.

4. A telephone handset cord cover as in claim 3, wherein said two edges are releasably secured to each other.

5. A telephone handset cord cover as in claim 1, wherein said means includes string encircling each end of said tube.

6. A telephone handset cord cover as in claim 1, wherein said tube is made of two layers of fabric.

7. A telephone handset cord cover as in claim 6, wherein opposite edges of each of said two layers are secured together.

8. A telephone handset cord cover as in claim 7, wherein said edges are releasably secured to each other.

9. In combination, a telephone having a base, a handset, and a coiled telephone handset cord interconnecting said base and said handset and an elongated tubular cover having an inner diameter greater than a cross-sectional diameter of coils forming said coiled telephone handset cord and having a greater length than said coiled handset cord in a relaxed condition for loosely surrounding said coiled cord when said cord is in either an extended or relaxed condition so as to prevent twisting and tangling of said coiled cord, and said tube being sufficiently flexible to gather together when said coiled cord is in the relaxed condition and movable to a less gathered condition when said coiled cord is in the extended condition.

10. The combination of claim 9, wherein said tube is made of fabric sufficiently flexible to gather together when the cord is in the relaxed condition and movable to a less gathered condition when the cord is in the stretched condition.

* * * * *